H. C. GOODRICH.

Tuck-Marker for Sewing-Machines.

No. 6,316. Reissued March 2, 1875.

WITNESSES.

P. C. Dieterich

H. C. McArthur

INVENTOR:

H. C. Goodrich per. C. H. Watson

Ass'd. ATTORNEY.

THE GRAPHIC CO. PHOTO-LITH. 39 & 41 PARK PLACE, N.Y.

UNITED STATES PATENT OFFICE.

HARRY C. GOODRICH, OF CHICAGO, ILLINOIS.

IMPROVEMENT IN TUCK-MARKERS FOR SEWING-MACHINES.

Specification forming part of Letters Patent No. 61,618, dated January 29, 1867; reissue No. 6,316, dated March 2, 1875; application filed February 11, 1875.

*To all whom it may concern:*

Be it known that I, HARRY C. GOODRICH, of Chicago, in the county of Cook and State of Illinois, have invented certain new and useful Improvements in Tuck-Markers for Sewing-Machines; and I do hereby declare that the following is a full, clear, and exact description thereof, that will enable others skilled in the art to which it appertains to make and use the same, reference being had to the accompanying drawings, and to the letters of reference marked thereon, which form a part of this specification.

The nature of my invention consists in providing a tuck-marker with a projecting lip or flange, to prevent the plait or tuck already made from being creased again while a second crease is being made; also, in providing the base-plate of a tuck-marker with an open space around the presser-foot; and in the construction and combination of parts, whereby a tuck-marker is formed that may be used with a "Barnum's Self-Sewer," or with a common gage of a sewing-machine, all as hereinafter more fully set forth.

Figure 1:
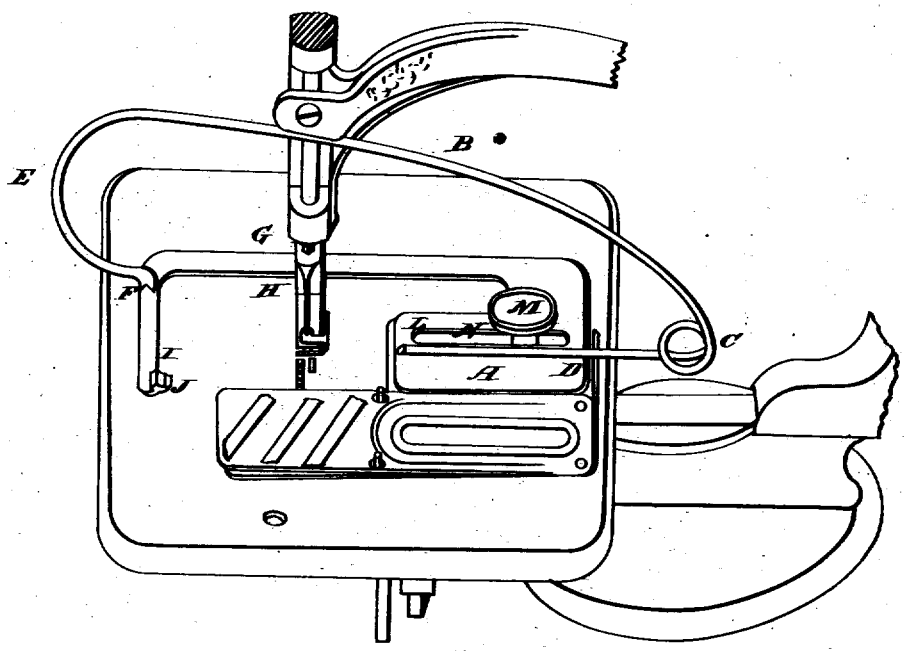
Figure 2:
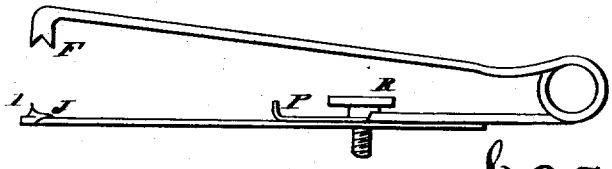

In the annexed drawing, Figure 1 is a perspective view of a portion of a sewing-machine with a Barnum's self-sewer and my tucker attached to it; and Fig. 2 is a side view of another form of tucker with a straight arm and an ordinary gage attached to it.

My tucker consists of a metallic plate, A, and spring-arm B, coiled at C, and fastened to the plate at D, said coil causing the arm to act upward after being forced downward by the needle bar or arm of the sewing-machine. The arm B of the tucker, being made straight or crooked, as will best adapt itself to the various sewing-machines, is bent at E, and has a notch, F, at its end. When straight, a projection, G, which may be adjustable or permanent, is attached to the needle bar or arm of the machine to work the tucker. The plate A has an arm, H, at the end of which is placed a spur, I, and a horizontal flange or lip, J. The spur I is for the purpose of forming the crease in the cloth upward when the notch F of the arm B is forced down upon it by the needle arm or bar. The lip or flange J is for the purpose of preventing the edge of the last-made tuck from riding up over the under marker and becoming creased a second time, and also to assist in guiding the cloth straight.

In the plate A is a slot, L, which has several purposes: First, to fasten the plate A of the tucker to the cloth-plate of the machine by means of the gage-screw M; second, to slide the tucker back and forth, adjusting it to the various widths of the tucks to be made; and, third, to adjust it to the slot N of Barnum's self-sewer when used in combination therewith, the gage-screw M answering all the purposes of fastening the tucker and self-sewer in any desired position.

The length of the arm B is such that, when pressed down, its notch F falls on the spur I, thereby making a crease in the cloth.

It is evident from the above that the arm of the tucker moves upward the full distance of the stroke of the needle bar or arm of the machine; that the tucker-plate may be attached with Barnum's self-sewer to the machine, and thus used in combination therewith; or that it may be used simply with an ordinary or common guide of a sewing-machine.

A self-sewer, when one is used, is first placed upon the cloth-plate of the machine, and the tucker-plate upon the self-sewer, covering a portion of it, and, after being adjusted for certain width of tuck, both tucker and self-sewer are fastened to the machine by the gage-screw, the arm of the tucker being put under the arm of the machine when crooked, and under the projections G on the needle-bar when straight. To make the first tuck, the cloth is to be folded and the folded edge placed into the Barnum's self-sewer and sewed, and, in passing through the guide, is creased by the tuck-maker. Then, to make the second and all succeeding tucks, fold the cloth again at the point creased, and place in the self-sewer, as before, putting the edge of the tuck already made under the horizontal flange J, said flange being for the purpose of guiding the cloth, and also to keep the tuck from coming in contact with the creasing-points—the spur and notch of the tucker.

Having thus fully described my invention, what I claim as new, and desire to secure by Letters Patent, is—

1. In a tuck-marker for sewing-machines, a lip or flange, J, arranged to prevent the last-made tuck from being creased a second time, as herein set forth.

2. The combination of plate A and its spur, of the notched arm B, coiled at C, to throw it upward in the path of and to be depressed by the movement of the needle-actuating devices, to crease the fabric, substantially as described.

In testimony that I claim the foregoing I have hereunto set my hand this 6th day of February, 1875.

HARRY C. GOODRICH.

Witnesses:
E. A. WEST,
O. W. BOND.